(12) United States Patent
Yamazaki et al.

(10) Patent No.: US 8,040,332 B2
(45) Date of Patent: Oct. 18, 2011

(54) LIGHT SCAN DEVICE AND IMAGE DISPLAY DEVICE

(75) Inventors: Tetsuro Yamazaki, Suwa (JP); Takashi Takeda, Suwa (JP); Daisuke Uchikawa, Matsumoto (JP); Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 890 days.

(21) Appl. No.: 11/463,460

(22) Filed: Aug. 9, 2006

(65) Prior Publication Data

US 2007/0035508 A1 Feb. 15, 2007

(30) Foreign Application Priority Data

Aug. 9, 2005 (JP) ................................. 2005-230403

(51) Int. Cl.
*G06F 3/038* (2006.01)
*G09G 5/00* (2006.01)
(52) U.S. Cl. ............... 345/204; 345/81; 345/84; 345/85
(58) Field of Classification Search .................... 345/31, 345/84, 85, 42, 204
See application file for complete search history.

(56) References Cited

U.S. PATENT DOCUMENTS

| 5,436,644 | A | 7/1995 | Motoi et al. |
| 2003/0107701 | A1* | 6/2003 | Shimoshikiryo et al. ...... 349/172 |
| 2004/0105267 | A1* | 6/2004 | Cho et al. ...................... 362/296 |
| 2005/0140930 | A1* | 6/2005 | Dvorkis et al. ................ 353/31 |

FOREIGN PATENT DOCUMENTS

| JP | A 01-245780 | 9/1989 |
| JP | 09-033836 | 2/1997 |

* cited by examiner

*Primary Examiner* — Amr Awad
*Assistant Examiner* — Andre Matthews
(74) *Attorney, Agent, or Firm* — Oliff & Berridge, PLC (57) ABSTRACT

A light scan device which forces a beam light depending on an image signal to scan, including: a light source part for supplying the beam light; and a scanning part for forcing the beam light from the light source part to scan an illumination-target region in a first direction and a second direction substantially orthogonal to the first direction, wherein the scanning part is driven so that a frequency with which the beam light is forced to scan in the first direction is higher than a frequency with which the beam light is forced to scan in the second direction, and a spot formed on the illumination-target region by the beam light has a form with a shorter size in the first direction than in the second direction.

12 Claims, 10 Drawing Sheets

RELATED ART

LIGHT SCAN DEVICE AND IMAGE DISPLAY DEVICE

BACKGROUND

1. Technical Field

The present invention relates to a light scan device and an image display device. Particularly, it relates to a technique for a light scan device for causing a laser light modulated according to an image signal to scan thereby to display an image.

2. Related Art

In recent years, a laser projector by which an image is displayed by forcing a laser light to scan has been proposed as an image display device for displaying an image. Laser light is characterized by its high monochromaticity and directivity. Therefore, a laser projector has an advantage such that an image can be obtained with a good color reproducibility. A technique for an image display device to display an image by forcing a laser light to scan has been proposed by e.g. JP-A-1-245780.

Typically, a laser light is shaped so that the form of a spot formed in an illumination-target region of a screen or the like is substantially circular. In this case, performing the modulation of the laser light at a timing when the center of the spot is incident on a pixel region will cause the laser light for display by a pixel to enter another pixel region neighboring the first pixel. Then, the occurrence of an event such that an image is blurred by modulated light incident on a location different from a location specified by the address information that an image signal carries, i.e. so-called crosstalk, makes it difficult to display an image with a high resolution owing to the unclear outline of the image, etc. To reduce such trouble, it can be considered that a laser light is turned on only in the situation where a whole laser light spot falls in a pixel region. However, in the case where the spot has a circular form with a size comparable to that of the pixel, the lighting time of the laser light for display by the pixel is shortened considerably, which leads to a dark image. To extend the lighting time of laser light, it is conceivable to make the circular spot smaller in comparison to one pixel in size. However, in this case, the gap between scanning lines along which the laser light is made to scan becomes more conspicuous, which makes it difficult to offer a seamless image. As described above, in the art there has been a problem such that it is difficult to display a bright image with high quality.

SUMMARY

An advantage of some aspects of the invention is to provide a light scan device for displaying a bright image with high quality and an image display device incorporating the light scan device.

To solve the problems and achieve the advantage, the invention can provide a light scan device which forces a beam light depending on an image signal to scan, including: a light source part for supplying the beam light; and a scanning part for forcing the beam light from the light source part to scan an illumination-target region in a first direction and a second direction substantially orthogonal to the first direction, wherein the scanning part is driven so that a frequency with which the beam light is forced to scan in the first direction is higher than a frequency with which the beam light is forced to scan in the second direction, and a spot formed on the illumination-target region by the beam light has a form with a shorter size in the first direction than in the second direction.

Formation of a spot having a form, whose size in the first direction is shorter than the size in the second direction, can reduce the blurring caused when the beam light for display of a pixel enters the region of another pixel. Also, the lighting time of the beam light with respect to a pixel can be elongated by making the width of the spot in the first direction smaller. Reduction in blurring caused when a beam light for display of a pixel enters the region of another pixel allows an image to be displayed with a high resolution. In addition, a bright image can be displayed by elongating the lighting time of a beam light with respect to a pixel. Further, formation of a spot having a form, whose size is longer in the second direction than in the other direction, can narrow a gap between pixels in the second direction. Still further, when the gap between scanning lines along which the beam light is forced to scan is made inconspicuous, a seamless image can be displayed. Thus, a light scan device for displaying a bright and high-quality image can be obtained.

According to a preferred embodiment of the invention, it is desirable that a length of the spot in the second direction is substantially equal to a length of a pixel formed according to the image signal in the second direction. This can make inconspicuous the gap between scanning lines along which the beam light is forced to scan and thus a seamless image can be displayed.

Further, according to a preferred embodiment of the invention, it is desirable that the spot has a substantially elliptical form. This makes it possible to attain a spot having a form whose size in the first direction is shorter than in the second direction.

Still further, according to a preferred embodiment of the invention, it is desirable that the spot has a substantially rectangular form. This makes it possible to attain a spot having a form whose size in the first direction is shorter than in the second direction.

Furthermore, according to a preferred embodiment of the invention, it is desirable that the light scan device further includes a beam-shaping optical system for shaping the spot. This makes it possible to form a spot having a desired form whose size in the first direction is shorter than in the second direction.

Moreover, according to a preferred embodiment of the invention, it is desirable that the light source part is driven for the purpose of forming a pixel depending on the image signal so as to turn on the beam light at a timing when an outer edge of the spot goes over a boundary of the pixel subsequently to a center position of the spot and turn off the beam light at a timing when the outer edge of the spot reaches another boundary of the pixel after turning on the beam light, provided that the outer edge of the spot is a line at which an intensity of the beam light is attenuated to half of a peak intensity of the spot. At a boundary of a pixel, the beam light intensity supplied to the pixel and the beam light intensity supplied to another pixel, which is scanned by the beam light subsequently, are added together. In the case where a line at which the beam light intensity is attenuated to the half of the peak intensity is defined as an outer edge of a spot, it can be made possible by attenuating the beam light intensity at a boundary of a pixel to differentiate the pixel. Thus, an image can be displayed with a high resolution.

In addition, according to a preferred embodiment of the invention, it is desirable that the light source part supplies the beam light having an intensity distribution substantially coincident with a Gaussian intensity distribution, and the light source part is driven with respect to the pixel so as to keep the beam light in ON state for a time t which satisfies the following Expression (1):

$$t = T\left[1 - \frac{2k\varpi_0}{Lp}\right] \quad (1)$$

where, $$\sqrt{\frac{\ln 2}{2}} \le k < \frac{Lp}{2\varpi_0}$$

where a time during which a center position of the soot is moved on an pixel depending to the image signal is represented by T, a Gaussian beam radius of the spot in the first direction is represented by $\omega_o$, and a length of the pixel in the first direction is represented by Lp. It should be noted that units herein adopted for the parameters are just examples.

The Gaussian beam radius $\omega_o$ can be determined based on the configurations of the light source part and the beam-shaping optical system, etc. appropriately. The time t is determined from the length Lp of the pixel in the first direction and the Gaussian beam radius $\omega_o$, whereby the blurring caused when a beam light for display of a certain pixel enters the region of another pixel adjacent to the certain pixel can be prevented. Thus, a light scan device for displaying a high-quality image can be obtained.

Also, according to a preferred embodiment of the invention, it is desirable that the following Expression (2) is satisfied:

$$1 \le k < \frac{Lp}{2\varpi_0} \quad (2)$$

When k is limited by Expression (2), the beam light intensity can be attenuated at a boundary of a pixel and therefore the blurring can be reduced.

According to a preferred embodiment of the invention, it is desirable that the following Expression (3) is further satisfied $$2 \le k < \frac{Lp}{2\varpi_0} \quad (3)$$

Restriction of k by Expression (3) enables further attenuation of the beam light intensity on the boundary of pixels and further reduction in blurring between pixels.

Also, according to a preferred embodiment of the invention, the following are desirable. The first is that the light source part supplies the beam light having an intensity distribution substantially coincident with a Gaussian intensity distribution. The second is that the light source part satisfies the following Expression (4):

$$\varpi_0 = \frac{Lp(T-t)}{2kT} \quad (4)$$

where, $$\sqrt{\frac{\ln 2}{2}} < k$$

where a length of a pixel formed according to the image signal in the first direction is represented by Lp, a time during which a center position of the spot is moved on the pixel is represented by T, a time during which the beam light is kept in ON state with respect to the pixel is represented by t, and a Gaussian beam radius of the spot in the first direction is represented by $\omega_o$.

The time t can be determined appropriately based on e.g. the brightness necessary for an image to be displayed. When the Gaussian beam radius $\omega_o$ of a spot in the first direction is determined from the time T and time t, the blurring caused when a beam light for display of a certain pixel enters the region of another pixel adjacent to the certain pixel can be prevented. Therefore, a light scan device for displaying a high-quality image can be achieved.

According to a preferred embodiment of the invention, it is preferable that k is equal to or larger than 1. When k takes on a value equal to 1 or larger, the beam light intensity can be attenuated on the boundary of pixels and the blurring between pixels can be reduced.

Also, according to a preferred embodiment of the invention, it is desirable that k is equal to or larger than 2. When k is made a value equal to or larger than 2, the beam light intensity at a boundary of a pixel can be further attenuated, and therefore the blurring between pixels can be reduced further.

In addition, according to some aspects of the invention, an image display device which displays an image according to a light from a light scan device can be provided. The image display device is characterized in the light scan device described here is one of the light scan devices according to the above-described light scan devices. Using the above-described light scan device enables a bright and high-quality image to be displayed. Thus, an image display device capable of displaying a bright and high-quality image can be achieved.

BRIEF DESCRIPTION OF THE DRAWINGS

The invention will be described with reference to the accompanying drawings, wherein like numbers reference like parts.

DESCRIPTION OF EXEMPLARY EMBODIMENTS

Details of embodiments of the invention will be described below with reference to the drawings.

First Embodiment

Figure 1:
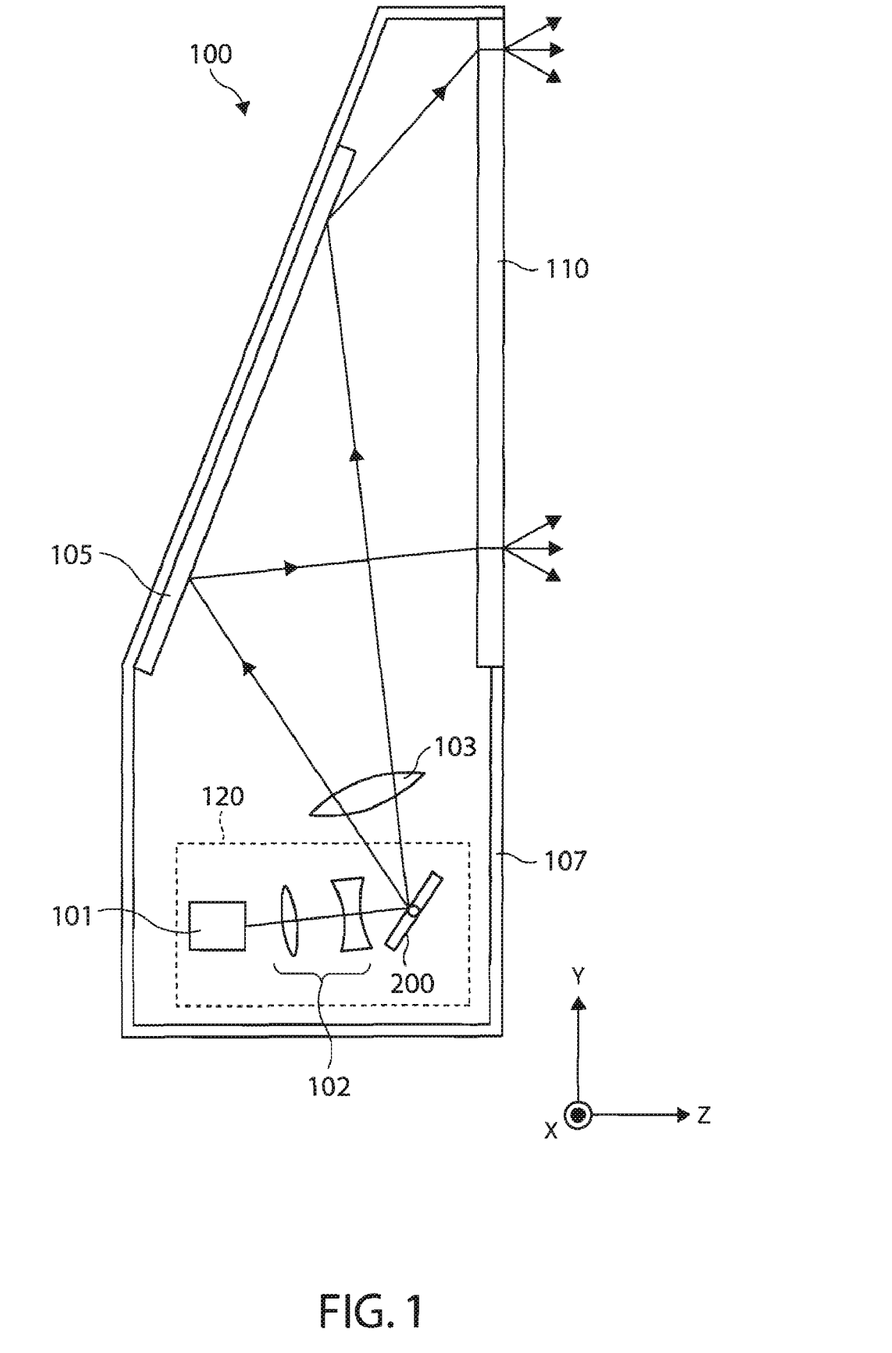
FIG. 1 is a view showing a schematic configuration of an image display device in association with the first embodiment of the invention.

FIG. 1 shows a schematic configuration of an image display device 100 in association with the first embodiment of the invention. The image display device 100 is a so-called rear projector such that a laser light is supplied to one plane of a screen 110 and an image is watched and/or enjoyed by observing light emitted from the other plane of the screen 110. A light scan device 120 provided in the image display device 100 forces the laser light depending on an image signal to scan. The light scan device 120 has a laser device 101, an illumination system 102, and a scanning part 200. The image display device 100 uses laser light from the light scan device 120 to display an image.

Figure 2:
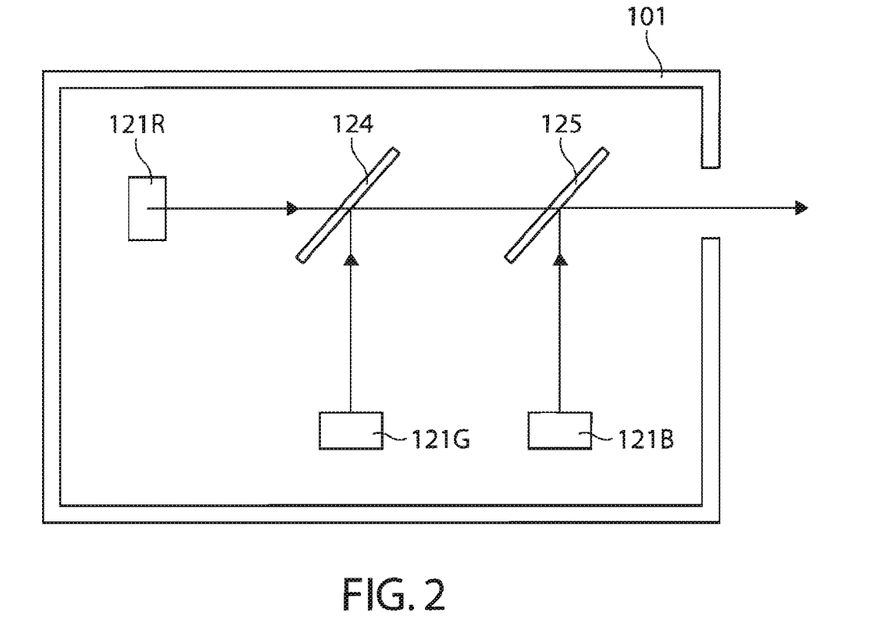
FIG. 2 is a view showing a schematic configuration of a laser device.

FIG. 2 shows a schematic configuration of the laser device 101. The laser device 101 has an R-light source 121R for supplying a red laser light (hereinafter referred to as "R light") as a beam light; a G-light source part 121G for supplying a green laser light (hereinafter referred to as "G light") as a beam light; and a B-light source part 121B for supplying a blue laser light (hereinafter referred to as "B light") as a beam light.

The light source parts 121R, 121G, 121B for individual color lights supply laser lights which are modulated according to image signals respectively. The modulation according to image signals may be any of amplitude modulation and pulse width modulation. The laser device 101 is provided with two dichroic mirrors 124 and 125. The dichroic mirror 124 allows R light to pass therethrough, and reflects G light. The dichroic mirror 125 allows R light and G light to pass therethrough, and reflects B light. R light from the R-light source part 121R is made to pass through the dichroic mirrors 124, 125 and then emitted from the laser device 101.

G light from the G light source part 121G is reflected off the dichroic mirror 124 and thus its optical path is bent by 90° substantially. The G light reflected by the dichroic mirror 124 goes through the dichroic mirror 125 and then goes out of the laser device 101. B light from the Blight source part 121B is reflected off the dichroic mirror 125 and thus its optical path is bent by 90° substantially. The B light reflected by the dichroic mirror 125 is emitted from the laser device 101. The laser device 101 supplies R, G and B lights modulated according to image signals in this way.

Referring again to FIG. 1, laser light from the laser device 101 goes through the illumination system 102 and then enters the scanning part 200. The light from the scanning part 200 goes through the projection optical system 103 and then impinges on the reflecting part 105. The Illumination system 102 and projection optical system 103 makes laser light from the laser device 101 focus on the screen 110. The reflecting part 105 reflects the laser light coming from the scanning part 200 toward the screen 110. The housing 107 seals up the space inside the housing 107.

The screen 110 is provided on a predetermined face of the housing 107. The screen 110 is a transmission-type screen, which allows laser light modulated according to an image signal to pass therethrough. The light coming from the reflecting part 105 enters the screen 110 from the face on the inner side of the housing 107 and then goes out of the screen from the face on the side of an observer. The observer observes light emitted from the screen 110 thereby to watch and/or enjoy an image.

Figure 3:
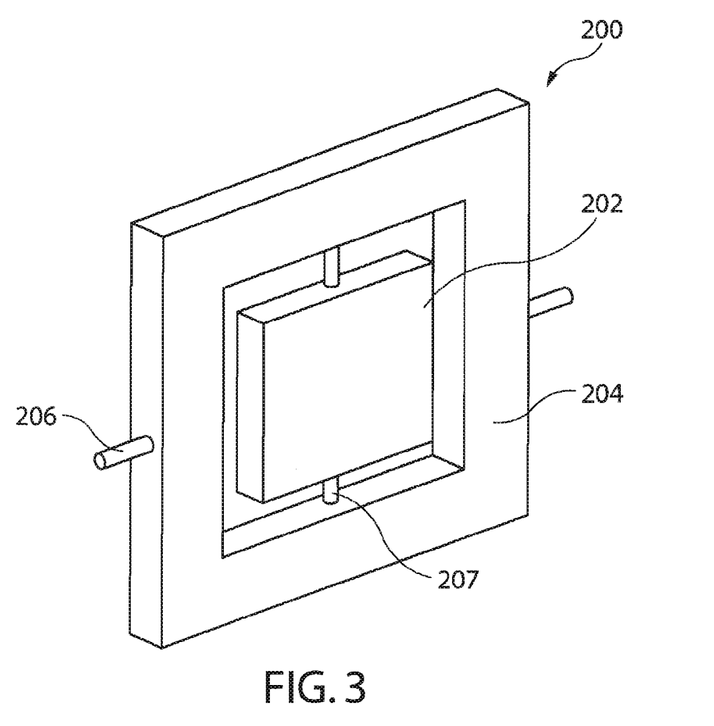
FIG. 3 is a view showing a schematic configuration of a scanning part.

FIG. 3 shows a schematic configuration of the scanning part 200. The scanning part 200 has a so-called double gimbal structure, which has a reflection mirror 202 and an outer frame part 204 provided around the reflection mirror 202. The outer frame part 204 is connected to a fixing part (not shown) through a torsion spring 206 which is a rotating shaft. When the outer frame part 204 is made to rotate around the torsion spring 206, the torsion of the torsion spring 206 and the restoration to its original state are utilized. The reflection mirror 202 is connected to the outer frame part 204 through the torsion spring 207 which is a rotating shaft substantially orthogonal to the torsion spring 206. The reflection mirror 202 reflects laser light from the laser device 101. The reflection mirror 202 can be constructed by forming a high-reflective member, e.g. a metal thin film of aluminum, silver or the like.

When the outer frame part 204 is made to rotate around the torsion spring 206, the reflection mirror 202 is displaced so that the laser light is forced to scan in Y direction on the screen 110 (see FIG. 1). Also, when the reflection mirror 202 is made to rotate around the torsion spring 207, the torsion of the torsion spring 207 and the restoration to its original state are utilized. When the reflection mirror 202 is made to rotate around the torsion spring 207, the laser light reflected by the reflection mirror 202 is displaced so that the laser light is forced to scan in X direction. As described above, the scanning part 200 forces a laser light from the laser device 101 to scan in X and Y directions repeatedly.

Figure 4:
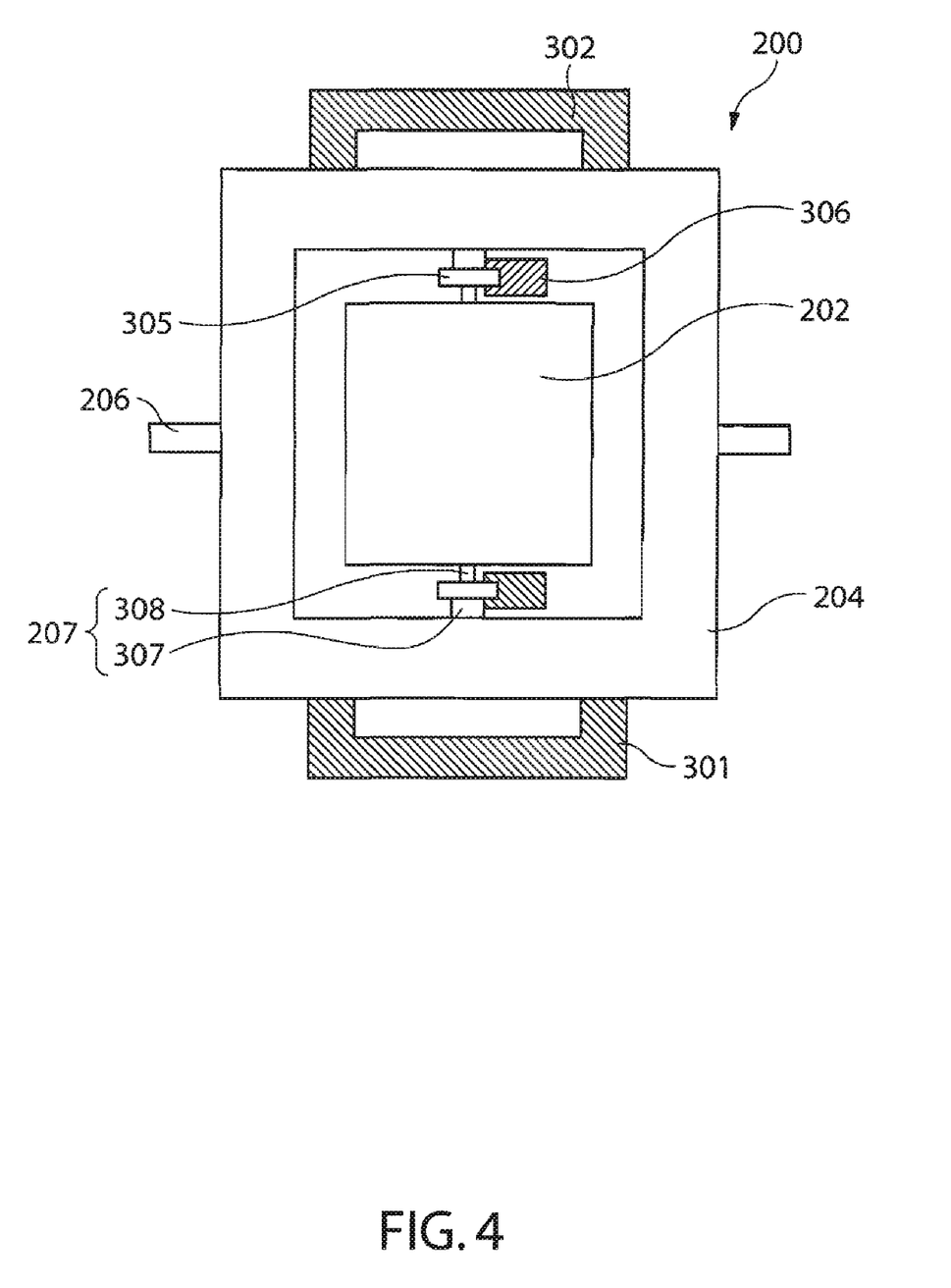
FIG. 4 is a view of assistance in explaining a configuration to drive the scanning part.

FIG. 4 is a view of assistance in explaining a configuration to drive the scanning part 200. Now, the side on which the reflection mirror 202 reflects laser light is herein referred to as "front side". Then, first electrodes 301 and 302 are provided at locations in a space on the rear side of the outer frame part 204 respectively, in which the locations are substantially symmetric with respect to the torsion spring 206. When a voltage is applied to the first electrodes 301 and 302, a predetermined force depending on the potential difference between the first electrodes 301 and 302 and the outer frame part 204, e.g. an electrostatic force, is generated therebetween. The outer frame part 204 is made to rotate around the torsion spring 206 by applying a voltage to the first electrodes 301 and 302 alternately.

Specifically, the torsion spring 207 is composed of a first torsion spring 307 and a second torsion spring 308. Between the first torsion spring 307 and the second torsion spring 308, a mirror-side electrode 305 is provided. Second electrodes 306 are provided in a space on the rear side of the mirror-side electrode 305. When a voltage is applied to the second electrodes 306, a predetermined force depending on the potential difference between the second electrodes 306 and the mirror-side electrode 305, e.g. an electrostatic force, is generated therebetween. When a voltage of the same phase is applied to the second electrodes 306, the reflection mirror 202 is made to rotate around the torsion spring 207. The scanning part 200 makes the reflection mirror 202 rotate thereby to force laser light to scan in two dimensional directions in this way. The scanning part 200 can be manufactured by MEMS (Micro Electro Mechanical Systems) technology.

For example, the scanning part 200 displaces the reflection mirror 202 so that in a period of one frame of an image, the laser light is made to go back and forth twice or more times in X direction, i.e. horizontal direction, while the laser light is made to scan once in Y direction i.e. vertical direction. Herein, X direction is referred to as "first direction," and Y direction is defined as "second direction" substantially orthogonal to the first direction. The scanning part 200 is driven so that the frequency at which a laser light is made to scan in the first direction is higher than the frequency at which the laser light is made to scan in the second direction. Incidentally, for the purpose of performing high-speed scanning of laser light in X direction, it is desired that the scanning part 200 is arranged so that the reflection mirror 202 is resonated around the torsion spring 207. So resonating the reflection mirror 202 can increase the amount of displacement of the reflection mirror 202. Increase in the amount of displacement of the reflection mirror 202 enables the scanning part 200 to force a laser light to scan efficiently with a small amount of energy. It is noted that the reflection mirror 202 may be driven without such resonance.

The scanning part 200 is not limited to an arrangement such that it is driven by an electrostatic force depending on the potential difference. For example, the scanning part 200 may be arranged so that it is driven by an expansion and contraction force of a piezoelectric device or electromagnetic force. The scanning part 200 may include a reflection mirror for forcing laser light to scan in X direction and another reflection mirror for forcing laser light to scan in Y direction. Further, the scanning part 200 is not limited to an arrangement such that a galvanometer mirror is used. A polygon mirror may be used instead, which is arranged so that a rotating body having two or more mirror pieces is rotated.

Figure 5:
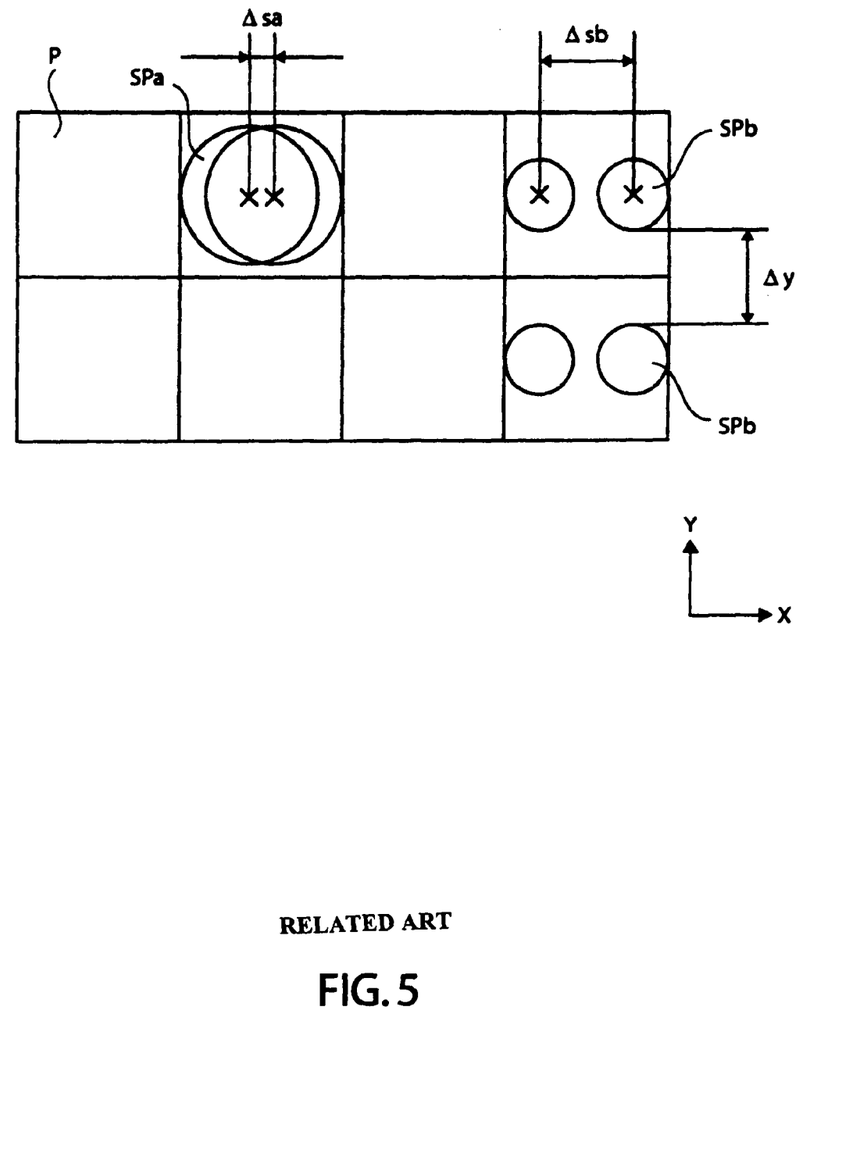
FIG. 5 is a view of assistance in explaining a spot of laser light when a prior art is used.

FIG. 5 is a view of assistance in explaining a laser light spot in the case where the conventional technique is used. With the conventional technique, laser light is typically shaped so that the form of a spot SPa formed in an illumination-target region of a screen or the like is substantially circular. When the modulation of laser light is carried out using a timing when the center position of the spot SPa enters the region of a pixel P, the laser light for display of the pixel P would enter the region of a pixel adjacent to the pixel P. Then, the occurrence of an event such that an image is blurred by modulated light incident on a location different from a location specified by the address information that an image signal carries, i.e. so-called crosstalk, makes it difficult to display an image with a high resolution owing to the unclear outline of the image, etc.

To reduce such trouble, it can be considered that a laser light is turned on only in the situation where a whole laser light spot SPa falls in a region of the pixel P. However, the movable distance Δsa of a spot SPa when the spot SPa falls in the region of a pixel P is made much shorter and as such, the time during which the laser light can stay ON while the laser light is moved on the pixel P is shortened remarkably. In the case where the spot SPa has a circular form with a size comparable to that of the pixel P, the time during which the laser light can stay ON for the pixel P is shortened considerably, which leads to a dark image.

In the case of a smaller spot SPb in comparison to a pixel P, the movable distance Δsb when the spot SPb falls in the region of one pixel can be made longer than the movable distance Δsa in the case of the spot SPa. In this case, the lighting time of laser light for one pixel P can be made longer on one hand. However, on the other hand, the interval Δy between spots SPb in Y direction, which is a sub-scanning direction, becomes larger. When the gap between scanning lines along which the laser light is made to scan becomes more conspicuous, it becomes difficult to offer a seamless image.

Figure 6:
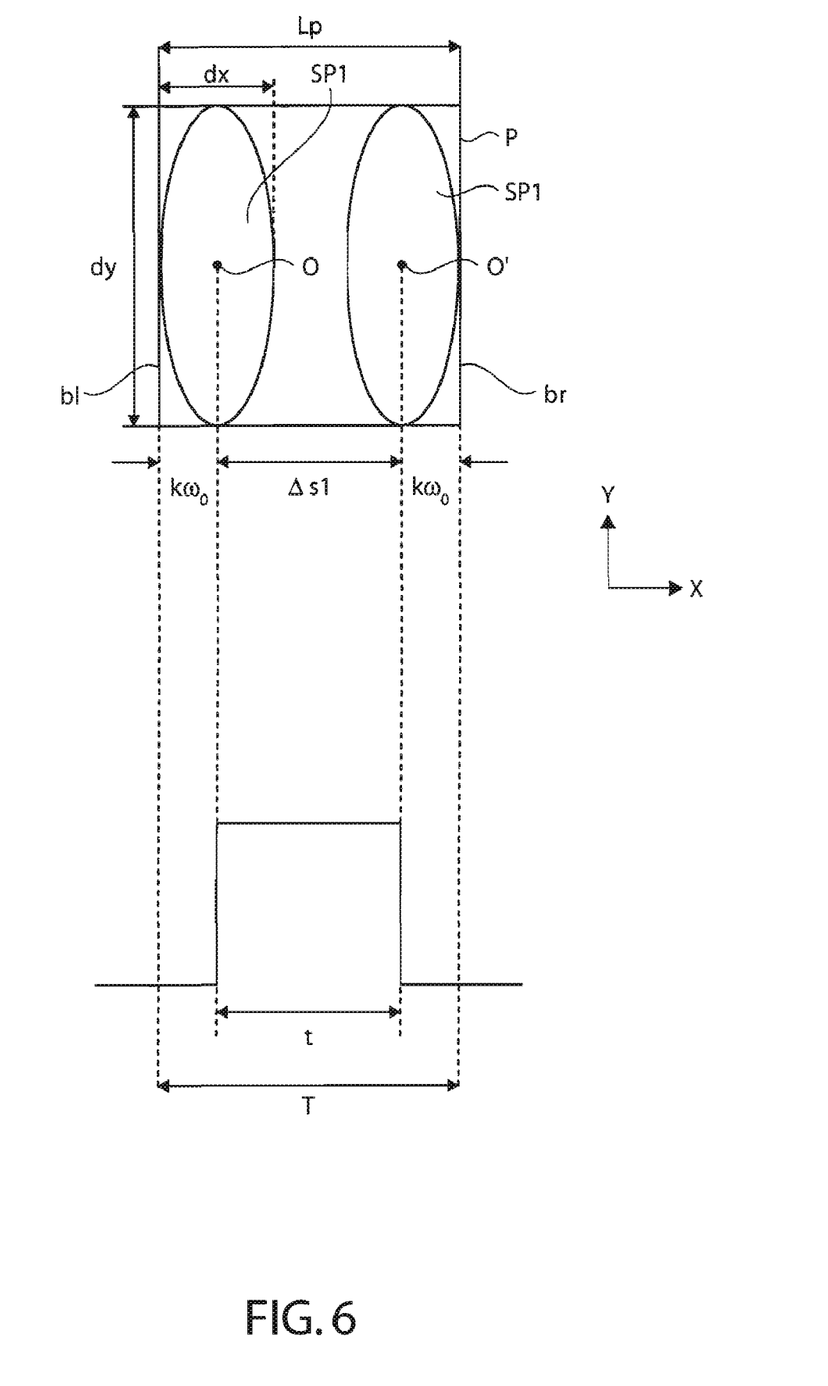
FIG. 6 is a view of assistance in explaining the form of the spot and the lighting time of laser light.

FIG. 6 is a view of assistance in explaining the form of laser light spot SP1 in an illumination-target region on the screen 110 and the lighting time of laser light to form one pixel P. The spot SP1 has a substantially elliptical form having a minor axis of a length dx in X direction and a major axis of a length dy in Y direction. The form of the spot SP1 has a shorter size in the first direction in comparison to the second direction. Formation of the spot SP1 having a form, whose size in X direction is shorter than the size in Y direction, can reduce the blurring caused when the laser light for display of a pixel P enters the region of another pixel P. In addition, the width dy of the spot SP1 in Y direction, which is the second direction, is substantially the same as the length of the pixel P in Y direction. Thus, the interval between pixels P in Y direction, which is the sub-scanning direction, can be made smaller.

Figure 7:
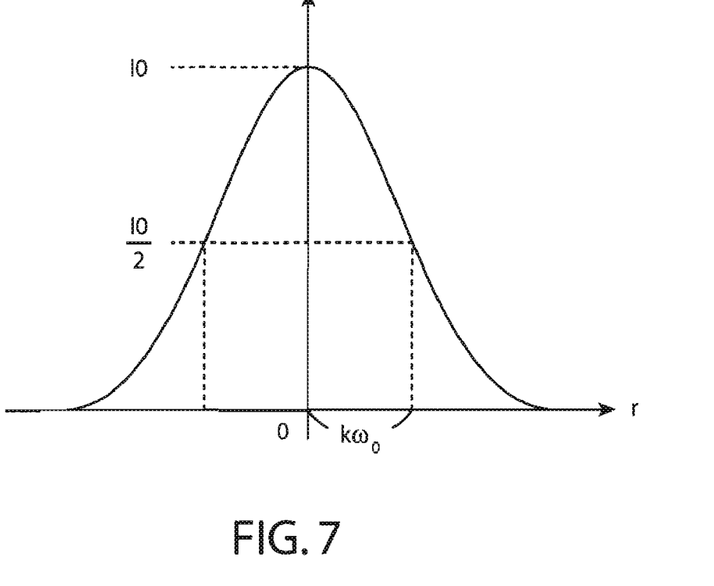
FIG. 7 is a view of assistance in explaining the laser light intensity distribution for the spot.

FIG. 7 is a view of assistance in explaining the laser light intensity distribution in the spot SP1. In FIG. 7, the vertical axis of the graph indicates the intensity I of laser light, and the horizontal axis indicates the distance from the center of the spot SP1. The laser light intensity distribution in the spot SP1 substantially agrees with a Gaussian intensity distribution with its peak intensity I0 located at the center position of the spot SP1. When the Gaussian beam radius in X direction, which is the first direction, is represented by $\omega_o$, the laser light intensity I at a location away from the center of the spot SP1 by a distance r can be expressed by the following Expression (5):

$$I = I0 \cdot \exp\left[-\frac{2r^2}{\omega_0^2}\right] \quad (5)$$

Here, an outer edge of the spot SP1 is defined as a line at which the laser light intensity I is attenuated to an intensity I0/2, which is the half of the peak intensity I0. When the distance r between the center of the spot SP1 and the outer edge is expressed as $r = k\omega_o$, k takes on the following value (≈0.589):

$$k = \sqrt{\frac{\ln 2}{2}}$$

Again, referring to FIG. 6, the light source part turns on the laser light at a timing when the outer edge of the spot SP1 goes over the left boundary b1, which is a boundary of a pixel P, subsequently to the passage of the center position of the spot SP1. Then, after the lighting of the laser light, the light source part turns off the laser light at a timing when the outer edge of the spot SP1 reaches the right boundary br, which is another boundary of the pixel P. Here, when the interval between the center position O of the spot SP1 at the timing when the laser light is turned on and the center position O' of the spot SP1 at the timing when the laser light is turned off is represented by Δs1, the light source part keeps the laser light in ON state while the center position of the spot SP1 goes through the interval Δs1 in the length Lp of the pixel P in X direction.

Here, the time elapsed while the center position of the spot SP1 moves over a pixel P is represented by T(sec.), the Gaussian beam radius of the spot SP1 in X direction is represented by $\omega_o$ (millimeter), the length of the pixel P in X direction is represented by Lp (millimeter), and k takes on the above value. When it is assumed that the speed at which the laser light is made to scan the pixel P is fixed, the ratio of (Lp-2k$\omega_o$) to Lp becomes equal to the ratio of t to T. Hence, the light source part is driven with respect to the pixel P for the time t (sec.) so that the laser light is kept in ON state, in which the time t satisfies the following Expression (1):

$$t = T\left[1 - \frac{2k\varpi_0}{Lp}\right] \quad (1)$$

The driving of the image display device 100 in this embodiment is controlled so that it supplies a laser light for a time t which is calculated according to Expression (1) with respect to a pixel P. In this embodiment, the width of spot SP1 in X direction is made smaller, whereby the lighting time t of the laser light for a pixel P can be made longer in comparison to the case where the spot has a substantially circular form. Increase in the lighting time t of the laser light for a pixel P enables display of a bright image. For example, in the case where the laser light is subjected to modulation by the amplitude modulation, the light source part modulates the laser light by a pulse signal changed in its amplitude for the time t. Also, in the case where the laser light is subjected to modulation by the pulse width modulation, the light source part modulates the laser light by a pulse signal changed in its pulse width using the time t as the maximum pulse width.

Figure 8:
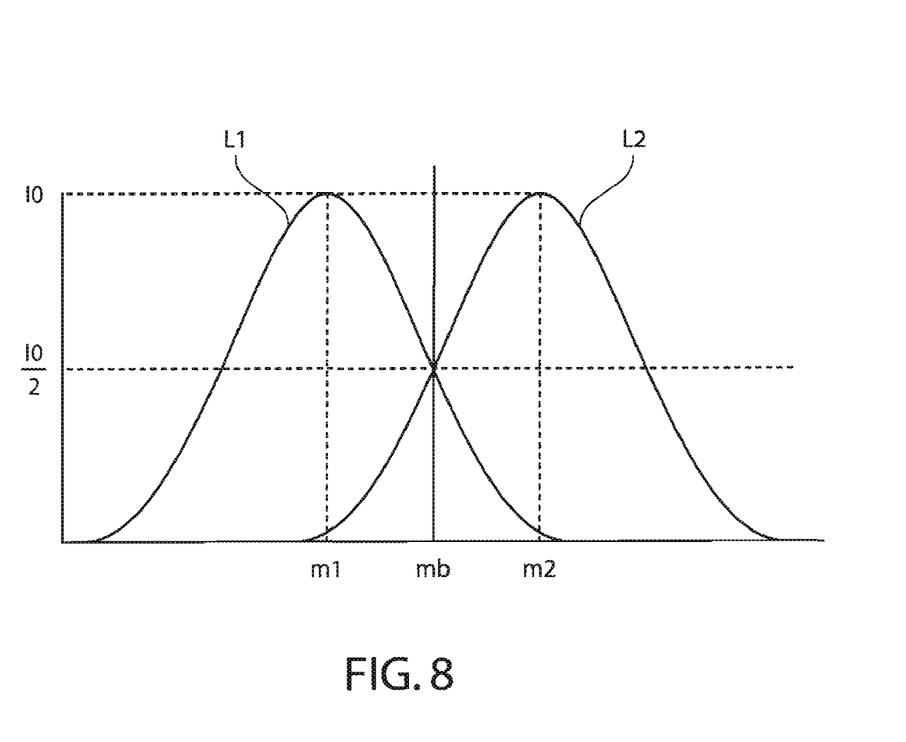
FIG. 8 is a view of assistance in explaining the intensity of laser light at a boundary between pixels.

FIG. 8 is a view of assistance in explaining the intensity of laser light at a boundary mb between pixels P. In FIG. 8, the vertical axis of the graph indicates the intensity of laser light, and the horizontal axis indicates the location of laser light in X direction. It is assumed concerning a pixel P that the beam light intensity at the boundary mb is I0/2 at a timing when the center position of the spot SP1 goes through m1. In addition, it is assumed that after the center position of the spot SP1 has gone over the boundary mb, the beam eight intensity at the boundary mb reaches I0/2 again at a timing when the center position of the spot SP1 passes through m2. The light source part stops supply of the laser light during the time when the center position of the spot SP1 moves from m1 to m2.

In the vicinity of the boundary mb, the laser light intensity distribution L1 for the certain pixel P and the laser light intensity distribution L2 for the subsequent pixel P are added together. Therefore, laser light for the adjacent pixel P is added to the peak intensity I0 at m1 and m2, and thus the intensity is made larger than the intensity I0. At the boundary mb, the beam light intensity I0/2 when the center position of the spot SP1 is located at m1 and the beam light intensity I0/2 when the center position of the spot SP1 is located at m2 are added together and thus the intensity there is substantially as large as the peak intensity I0. As described above, when the line at which the intensity of laser light is attenuated to the half of the peak intensity is defined as an outer edge of a spot of the laser light, it becomes possible to attenuate the beam light intensity at a boundary of a pixel thereby to differentiate the pixels.

According to the invention, the blurring caused when the laser light for display of a pixel P enters the region of another pixel P is reduced, whereby an image can be displayed with high resolution. In addition, a bright image can be displayed by elongating the lighting time of laser light for a pixel P. Further, formation of a spot SP1 having a Y-directional length which is substantially the same as that of the pixel P makes inconspicuous the gap between scanning lines along which the laser light is made to scan and therefore enables display of a seamless image. Thus, an effect that a bright and high-quality image can be displayed is produced.

It is noted that the value of k in Expression (1) is not limited to the above-described value. The value of k may be an arbitrary value as long as it satisfies the following Expression (6):

$$\sqrt{\frac{\ln 2}{2}} \le k < \frac{Lp}{2\varpi_0} \quad (6)$$

This makes possible to regard the outer edge of a spot as a line at which the intensity of laser light is attenuated to the half of the peak intensity or smaller and therefore pixels P can be differentiated. Also, k may be limited by the following Expression (2):

$$1 \le k < \frac{Lp}{2\varpi_0} \quad (2)$$

Figure 9:
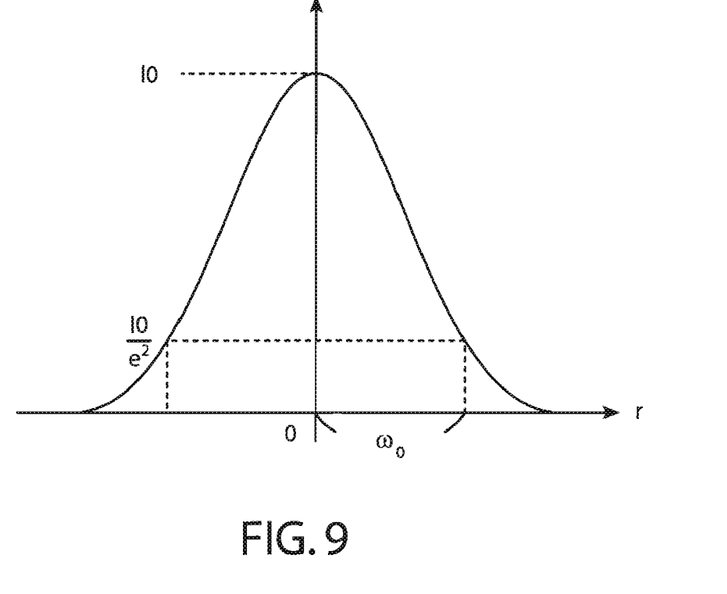
FIG. 9 is a view of assistance in explaining the distance from the center position of a spot to the outer edge thereof.

For example, when k=1, the distance r (=k$\varpi_o$) from the center position of the spot SP1 to the outer edge thereof is the Gaussian beam radius $\varpi_o$, as shown in FIG. 9. In this case, the outer edge of the spot SP1 is a line at which the laser light intensity I is attenuated to I0/$e^2$ (≈0.135I0, "e" is the base of a natural logarithm). Further in the case, the light source part is driven with respect to the pixel P for the time t (sec.) so that the laser light is kept in ON state, in which the time t satisfies the following Expression (7):

$$t = T\left[1 - \frac{2\varpi_0}{Lp}\right] \quad (7)$$

By making k a value which satisfies Expression (2), the intensity of laser light can be further attenuated at a boundary of a pixel P, whereby the blurring between pixels P can be further reduced. Further, k may be limited by the following Expression (3)

$$2 \le k < \frac{Lp}{2\varpi_0} \quad (3)$$

Figure 10:
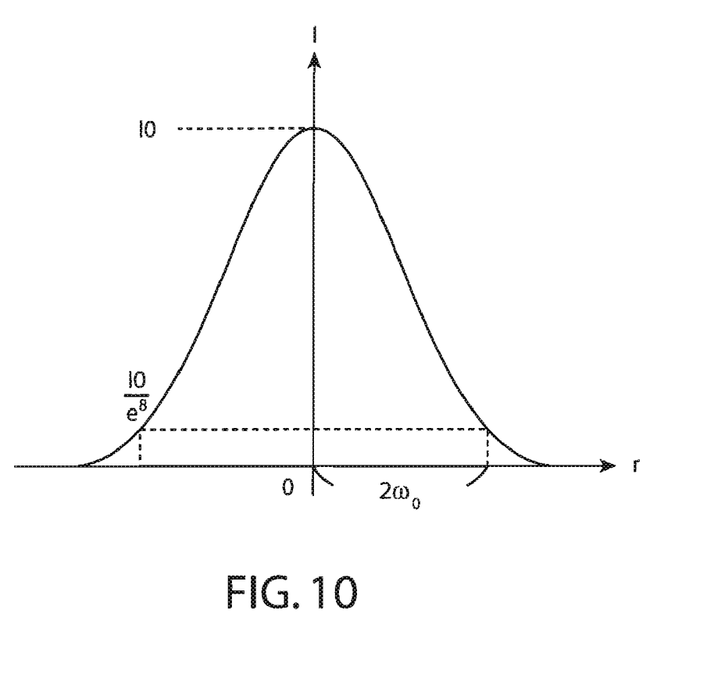
FIG. 10 is another view of assistance in explaining the distance from the center position of a spot to the outer edge thereof.

For example, when k=2, the distance r (=k$\varpi_o$) from the center position of the spot SP1 to the outer edge thereof is 2$\varpi_o$, as shown in FIG. 10. In this case, the outer edge of the spot SP1 is a line at which the laser light intensity I is attenuated to I0/$e^8$ (≈3.34×$10^{-4}$I0). Further in the case, the light source part is driven with respect to the pixel P for the time t (sec.) so that the laser light is kept in ON state, in which the time t satisfies the following Expression (8)

$$t = T\left[1 - \frac{4\varpi_0}{Lp}\right] \quad (8)$$

By making k a value which satisfies Expression (3), the intensity of laser light can be further attenuated at a boundary of pixels P and the blurring between pixels P can be further reduced.

Figure 11:
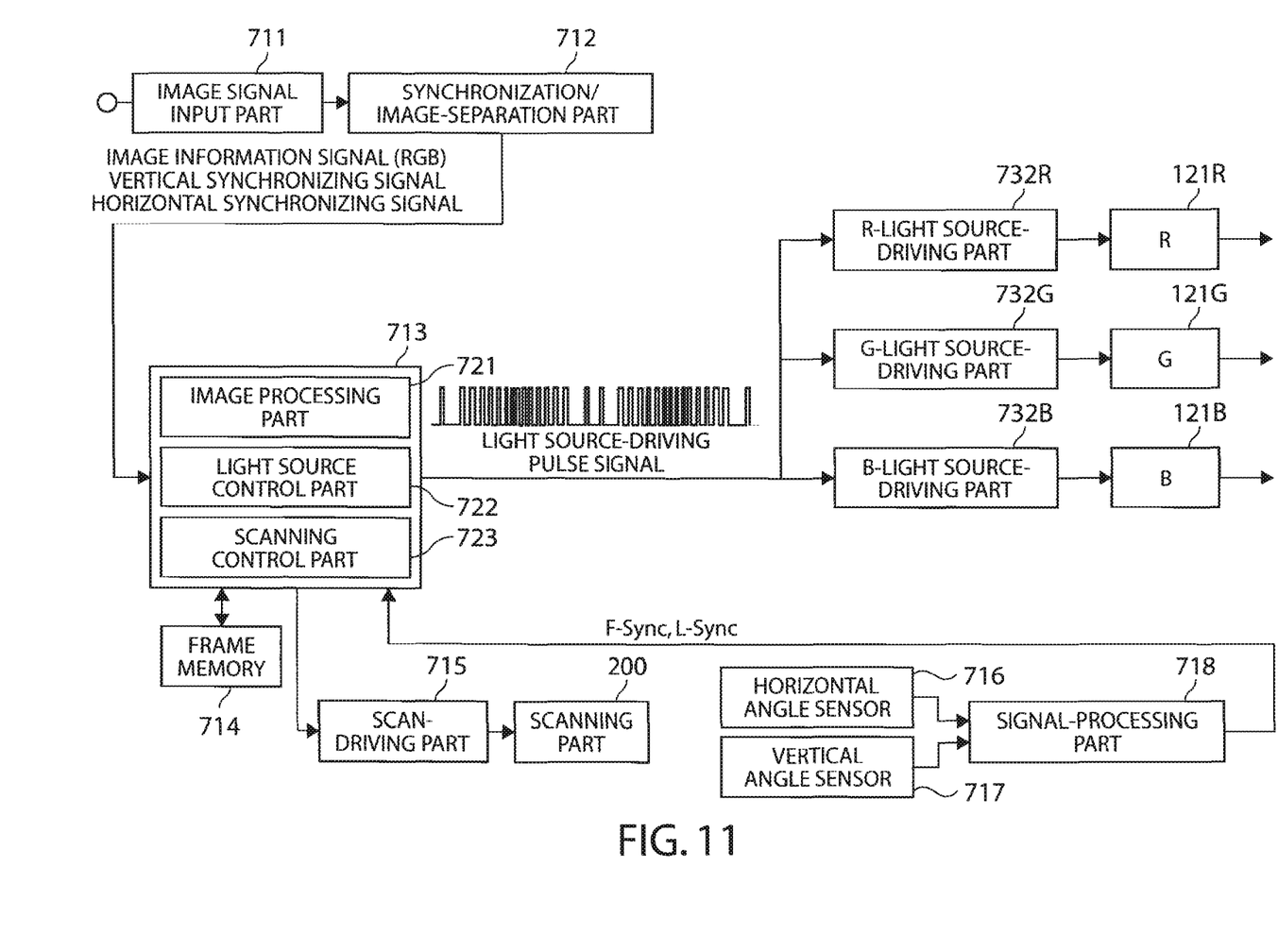
FIG. 11 is a view showing a block diagram for controlling the image display device.

FIG. 11 shows a block diagram for controlling the image display device 100. The image signal input part 711 performs correction of a property of an image signal input from an input terminal, amplification thereof, etc. For example, the image signal input part 711 converts an image signal of analog format into an intensity signal for light source modulation of digital format. The image signal input part 711 may be arranged so as to output an image signal of digital format as an intensity signal for light source modulation of digital format. The synchronization/image-separation part 712 separates a signal from the image signal input part 711 into an image information signal, a vertical synchronizing signal and a horizontal synchronizing signal for each of R light, G light and B light and outputs the resultant signals to the control part 713. In the control part 713, the image processing part 721 divides image information into pieces of information according to individual frames and outputs the resultant pieces of information to the frame memory 714. Image signals from the image processing part 721 is stored in the frame memory 714 by frames.

The scanning control part 723 in the control part 713 produces a drive signal for driving the scanning part 200 based on a vertical synchronizing signal and a horizontal synchronizing signal. The scan-driving part 715 drives the scanning part 200 in response to a drive signal from the control part 713. The horizontal angle sensor 716 detects a swing angle of the reflection mirror 202 (FIG. 3) for forcing laser light to scan in X direction on the screen 110. The vertical angle sensor 717 detects a swing angle of the reflection mirror 202 for forcing laser light to scan in Y direction on the screen 110. The signal-processing part 718 produces a frame-start signal F_Sync from the displacement of the vertical angle sensor 717 and a line-start signal L_Sync from the displacement of the horizontal angle sensor 716 and outputs the resultant signals to the control part 713.

The control part 713 produces a pixel timing clock based on: a linear speed derived from the calculation based on the frame-start signal F_Sync and the line-start signal L_Sync; a vertical synchronizing signal; and a horizontal synchronizing signal. The pixel timing clock is a signal to know a timing when a laser light passes through each pixel and is intended to launch a laser light subjected to the modulation according to an image signal into a precise location. The control part 713 further produces a light source-driving pulse signal from the pixel timing clock. The light source-driving pulse signal enables the laser light to be kept in ON state for the time t which satisfies Expression (1), etc.

The R-light source-driving part 732R drives the R-light source part 121R based on an image information signal on R light read out from the frame memory 714 by the light source control part 722, and a light source-driving pulse signal. The R-light source-driving part 732R controls ON/OFF of the R-light source part 121R according to the light source-driving pulse signal. Also, the R-light source-driving part 732R modulates R light according to a drive signal subjected to modulation of its pulse width according to an image information signal. Also, the G-light source-driving part 732G drives the G-light source part 121G as in the case of the R-light source-driving part 732R. The B-light source-driving part 732B drives the B-light source part 121B as in the case of the R-light source-driving part 732R. The light source-driving parts 732R, 732G and 732B may be arranged so as to perform modulation according to a drive signal which has been modulated in amplitude according to an image information signal. In this case, the image signal input part 711 is arranged so as to amplitude an image signal of analog format thereby to output an analog format intensity signal for light source modulation, or so as to convert an image signal of digital format into an analog format signal.

When e.g. an vertical cavity surface emitting laser (VCSEL) is used as each of the light source parts 121R, 121G, 121B, it is possible to supply a laser light with its spot having a substantially elliptical form. In the case where a laser light with the spot having a substantially elliptical form can be supplied, the spot can be shaped into a substantially elliptical form by focusing the laser light using the illumination system 102 and projection optical system 103 (FIG. 1) Further, in the case of transforming the spot or the case where the light source parts 121R, 121G and 121B supply a laser light which can form a spot of a substantially circular form, a beam-shaping optical system, which will be described below, can be used under the condition where e.g. a light-emission-from-face type semiconductor laser is used.

Figure 12:
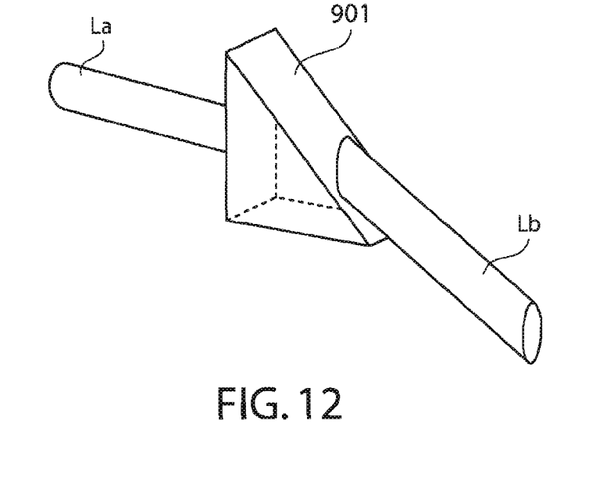
FIG. 12 is a view of assistance in explaining shaping of the spot form by a beam-shaping optical system.

FIG. 12 is a view of assistance in explaining the spot shaping by an anamorphic prism 901 which Is a beam-shaping optical system. The anamorphic prism 901 is disposed in an optical path between the laser device 101 and the scanning part 200 (see FIG. 1) The anamorphic prism 901 uses the effect of refraction to enlarge a laser light La having a substantially circular form in section in a vertical direction and then emits a laser light Lb having a substantially elliptical form in section. In this way, the spot can be changed so as to have a desired form. Incidentally, it does not matter what the anamorphic prism 901 is as long as it is arranged so that it can expand or contract the spot in a particular direction. The beam-shaping optical system may include, for example, both an anamorphic prism which changes the diameter of the spot in the vertical direction and an anamorphic prism which changes the diameter of the spot in the horizontal direction.

The beam-shaping optical system is not limited to the anamorphic prism 901, and it may be arranged otherwise. For example, the following may be used as the beam-shaping optical system: an aperture including an opening having a desired elliptical form; DOE (Diffractive Optical Elements); a cylindrical lens; and an aspherical lens. When an aperture is used as the beam-shaping optical system, a laser light having a desired spot form can be obtained easily, however the aperture obstructs the laser light, leading to the reduction in light use efficiency.

Also, the invention can be applied to the case where the laser light has an intensity distribution other than Gaussian intensity distribution. For example, when DOE is used as a beam-shaping optical system, it is conceivable that the laser light intensity distribution in the spot does not become a Gaussian intensity distribution. However, even when it is different from the Gaussian intensity distribution, the laser light intensity distribution is considered to have a peak near the center of the spot typically. Therefore, even when the lighting time t of laser light is determined based on the form of a spot visually observed in an illumination-target region as in this embodiment, the effect of the invention can be achieved sufficiently.

Second Embodiment

Figure 13:
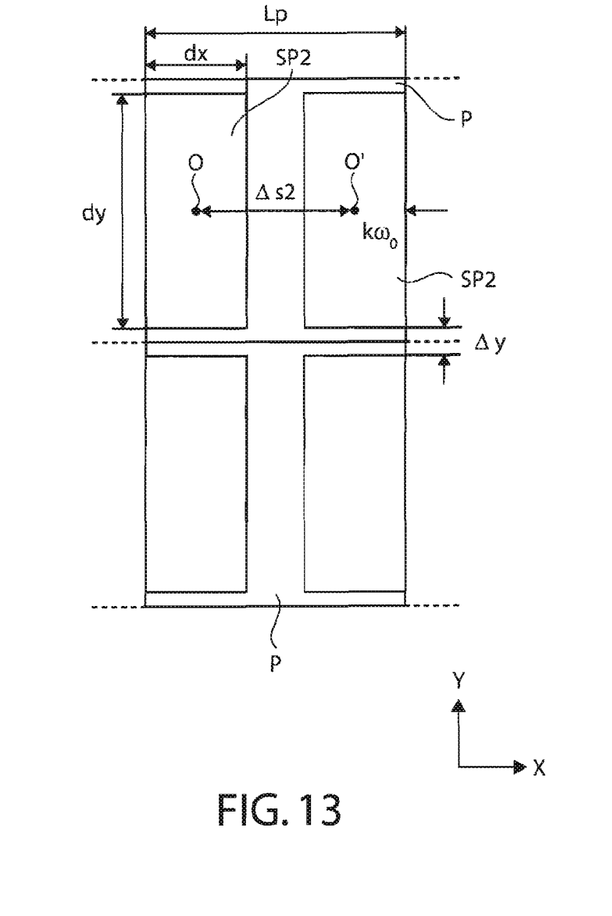
FIG. 13 is a view of assistance in explaining an image display device in association with the second embodiment of the invention.

FIG. 13 is a view of assistance in explaining an image display device in association with the second embodiment of the invention, and it shows a spot SP2 of laser light in an illumination-target region. In the first embodiment the lighting time t of the laser light is determined based on the form of a spot SP1, whereas in the second embodiment the form of a spot SP2 is determined from the time t during which the laser light is kept in ON state. Also, in this embodiment, the spot SP2 has a substantially rectangular form having a width dy in Y direction, i.e. the second direction, and a width dx in X direction, i.e. the first direction, in which the width dx is shorter than the width dy. Here, the same parts as those in the first embodiment are identified by the same reference characters to omit their repeated descriptions.

Here, when the interval between the center position O of the spot SP2 at the timing when the laser light is turned on and the center position O' of the spot SP2 at the timing when the laser light is turned off is represented by Δs2, the light source part keeps the laser light in ON state while the center position of the spot SP2 goes through the Interval Δs2 in the length Lp of the pixel P in X direction. Here, when the length of a pixel P in X direction is represented by Lp (millimeter the time elapsed while the center position of the spot SP2 moves over a pixel P is represented by t (sec.), the time during which a beam light is kept in ON state with respect to a pixel P is represented by t (sec.), and the Gaussian beam radius of the spot SP2 in X direction is represented by $\omega_o$ (millimeter), the following Expression (4) is satisfied:

$$\varpi_0 = \frac{Lp(T-t)}{2kT} \quad (4)$$

$$\text{where, } \sqrt{\frac{\ln 2}{2}} \leq k$$

Also, in this embodiment, for example, k takes on the following value, the outer edge of the spot SP2 may be made a line at which the intensity of laser light is attenuated to the half of the peak intensity:

$$k = \sqrt{\frac{\ln 2}{2}}$$

In the embodiment, the image display device determines the form of the spot SP2 so that the Gaussian beam radius $\omega_o$ satisfies Expression (4). Also, in the case of this embodiment, a bright and high-quality image can be displayed as in the case of the first embodiment. In addition, k may be a value which satisfies that k is equal to or larger than 1. This enables attenuation of the intensity of laser light at a boundary of a pixel P and therefore the blurring between pixels P can be reduced. Further, k may be made a value which satisfies k is equal to or larger than 2. Thus, the intensity of laser light can be attenuated at a boundary of a pixel P and therefore the blurring between pixels P can be reduced further.

In this embodiment, the width dy of the spot SP2 in Y direction is somewhat smaller than the width of the pixel P in Y direction. Therefore, in Y direction, which is the sub-scanning direction, an interval Δy between spots SP2 arises. A spot SP2 smaller than a pixel P in Y direction as described in this embodiment may be formed, as long as the gap between scanning lines along which the laser light is made to scan is inconspicuous. This applies also to the case of forming a spot having a substantially elliptical form as in the first embodiment. In this embodiment, a spot SP2 having a substantially rectangular form can be obtained easily by using e.g. an aperture or DOE as the beam-shaping optical system.

Third Embodiment

Figure 14:
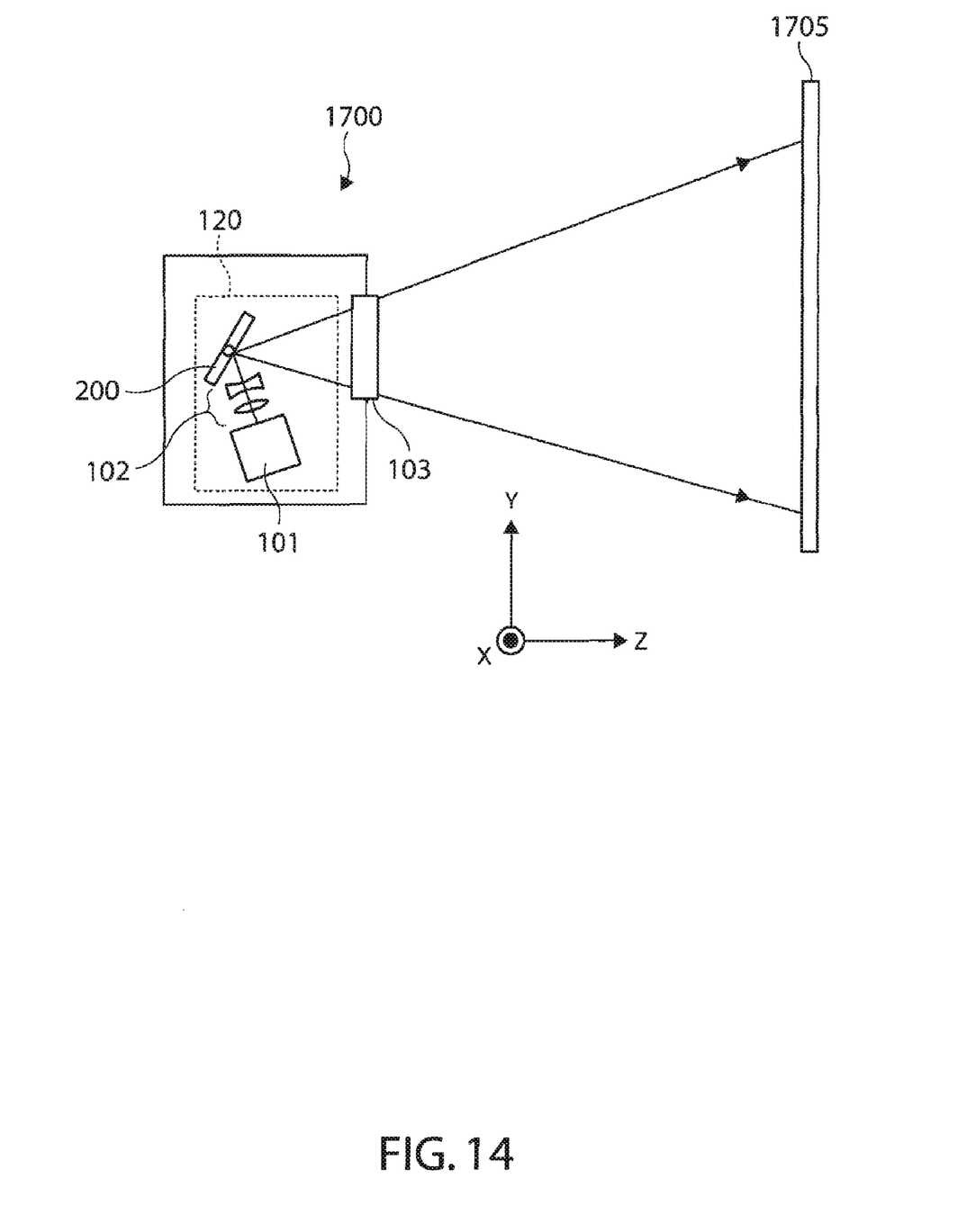
FIG. 14 is a view showing a schematic configuration of an image display device in association with the third embodiment of the invention.

FIG. 14 shows a schematic configuration of an image display device 1700 in association with the third embodiment of the invention. The image display device 1700 is a so-called front projection type projector by which a laser light is supplied to a screen 1705 provided on the side of an observer and an image can be watched and/or enjoyed by observing the light reflected by the screen 1705. The image display device 1700 has a light scan device 120 as in the first embodiment. Here, the same parts as those in the first embodiment are identified by the same reference characters to omit their repeated descriptions. Laser light from the light scan device 120 passes through the projection optical system 103 and then impinges on the screen 1705. Also, in this embodiment, a bright and high-quality image can be displayed.

In this embodiment, the light source parts for individual color lights are arranged so as to supply respective laser lights. However, they are not so limited to the arrangement as long as they can supply light in a beam form. For example, a solid light-emitting element such as a light-emitting diode (LED) may be used as the light source part for each color. In addition, the light scan device according to some aspects of the invention may be used for electronic equipment for forcing laser light to scan, such as a laser printer, in addition to an application to an image display device.

As described above, the light scan device in association with the invention is suitable for use in an image display device which forces light to scan according to an image signal.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

The entire disclosure of Japanese Patent Application No. 2005-230403, filed Aug. 9, 2005 is expressly incorporated by reference herein.

What is claimed is:

1. A light scan device which forces a beam light to scan depending on an image signal, comprising:
   a light source part for supplying the beam light; and
   a scanning part for forcing the beam light from the light source part to scan an illumination-target region in a first direction and a second direction substantially orthogonal to the first direction, wherein
      the scanning part is driven so that a frequency with which the beam light is forced to scan in the first direction is higher than a frequency with which the beam light is forced to scan in the second direction,
      a spot formed on a pixel of the illumination-target region by the beam light has a form with a shorter size in the first direction than in the second direction, a length of the spot in the second direction is substantially equal to a length of a pixel formed according to the image signal in the second direction, and the length of the spot in the first direction is less than the length of the pixel formed according to the image signal in the first direction, and
      the light source part is driven so as to turn on the beam light with respect to a pixel depending on the image signal at a timing when an outer edge of the spot goes over a boundary of the pixel subsequently to a center position of the spot and turn off the beam light at a timing when the outer edge of the spot reaches another boundary of the pixel after turning on the beam light, provided that the outer edge of the spot is a line at which an intensity of the beam light is attenuated to predetermined intensity which is half of a peak intensity of the spot.

2. The light scan device of claim 1, wherein the spot has a substantially elliptical form.

3. The light scan device of claim 1, wherein the spot has a substantially rectangular form.

4. The light scan device of claim 1, further comprising a beam-shaping optical system for shaping the spot.

5. The light scan device of claim 1, wherein the light source part supplies the beam light having an intensity distribution substantially coincident with a Gaussian intensity distribution, and the light source part is driven with respect to the pixel so as to keep the beam light in ON state for a time t which satisfies the following conditional expression:

$$t = T\left[1 - \frac{2k\varpi_0}{Lp}\right] \qquad (1)$$

$$\text{where, } \sqrt{\frac{\ln 2}{2}} \leq k < \frac{Lp}{2\varpi_0}$$

where a time during which a center position of the spot is moved on an pixel depending to the image signal is represented by T, a Gaussian beam radius of the spot in the first direction is represented by $\varpi_o$, and a length of the pixel in the first direction is represented by Lp.

6. The light scan device of claim 1, wherein the light source part supplies the beam light having an intensity distribution substantially coincident with a Gaussian intensity distribution, and the light source part satisfies the following conditional expression:

$$\varpi_0 = \frac{Lp(T-t)}{2kT} \qquad (4)$$

$$\text{where, } \sqrt{\frac{\ln 2}{2}} \leq k$$

where a length of a pixel formed according to the image signal in the first direction is represented by Lp, a time during which a center position of the spot is moved on the pixel is represented by T, a time during which the beam light is kept in ON state with respect to the pixel is represented by t, and a Gaussian beam radius of the spot in the first direction is represented by $\varpi_o$.

7. An image display device which displays an image according to a light from a light scan device, wherein the light scan device includes:

a light source part for supplying the beam light; and a scanning part for forcing the beam light from the light source part to scan an illumination-target region in a first direction and a second direction substantially orthogonal to the first direction, wherein the scanning part is driven so that a frequency with which the beam light is forced to scan in the first direction is higher than a frequency with which the beam light is forced to scan in the second direction, a spot formed on a pixel of the illumination-target region by the beam light has a form with a shorter size in the first direction than in the second, direction, a length of the spot in the second direction is substantially equal in length of a pixel formed according to the image signal in the second direction, and the length of the spot in the first direction is less than the length of the pixel formed according to the image signal in the first direction, and the light source part is driven so as to turn on the beam light with respect to a pixel depending on the image signal at a timing when an outer edge of the spot goes over a boundary of the pixel subsequently to a center position of the spot and turn off the beam light at a timing when the outer edge of the spot reaches another boundary of the pixel after turning on the beam light, provided that the outer edge of the spot is a line at which an intensity of the beam light is attenuated to predetermined intensity which is half of a peak intensity of the spot.

8. The image display device of claim 7, wherein the spot has a substantially elliptical form.

9. The image display device of claim 7, wherein the spot has a substantially rectangular form.

10. The image display device of claim 7, further comprising a beam-shaping optical system for shaping the spot.

11. The image display device of claim 7, wherein the light source part supplies the beam light having an intensity distribution substantially coincident with a Gaussian intensity distribution, and the light source part is driven with respect to the pixel so as to keep the beam light in ON state for a time t which satisfies the following conditional expression:

$$t = T\left[1 - \frac{2k\varpi_0}{Lp}\right] \qquad (1)$$

$$\text{where, } \sqrt{\frac{\ln 2}{2}} \leq k < \frac{Lp}{2\varpi_0}$$

where a time during which a center position of the spot is moved on an pixel depending to the image signal is represented by T, a Gaussian beam radius of the spot in the first direction is represented by $\varpi_o$, and a length of the pixel in the first direction is represented by Lp.

12. The image display device of claim 7, wherein the light source part supplies the beam light having an intensity distribution substantially coincident with a Gaussian intensity distribution, and the light source part satisfies the following conditional expression:

$$\varpi_0 = \frac{Lp(T-t)}{2kT} \qquad (4)$$

$$\text{where, } \sqrt{\frac{\ln 2}{2}} \leq k$$

where a length of a pixel formed according to the image signal in the first direction is represented by Lp, a time during which a center position of the spot is moved on the pixel is represented by T, a time during which the beam light is kept in ON state with respect to the pixel is represented by t, and a Gaussian beam radius of the spot in the first direction is represented by $\omega$.

\* \* \* \* \*